United States Patent [19]
Muller

[11] Patent Number: 6,082,818
[45] Date of Patent: Jul. 4, 2000

[54] DEVICE FOR RELEASABLE MOUNTING OF OBJECTS, IN PARTICULAR CHILDREN SEATS, ON A VEHICLE SEAT WITH FOLDABLE BACK

[75] Inventor: Fritz Muller, Affalterbach, Germany

[73] Assignee: Bertrand Faure Sitztechnik GmbH & Co. KG, Stadthagen, Germany

[21] Appl. No.: 08/982,789

[22] Filed: Dec. 2, 1997

[30]    Foreign Application Priority Data

Dec. 3, 1996  [DE]  Germany ............................ 196 50 087

[51] Int. Cl.[7] ........................................................ A47C 1/08
[52] U.S. Cl. ............................... 297/250.1; 297/354.13; 297/452.2; 297/253
[58] Field of Search ................................ 297/253, 250.1, 297/354.12, 354.13, 424.18, 452.2

[56]    References Cited

U.S. PATENT DOCUMENTS

| | | | |
|---|---|---|---|
| 5,433,507 | 7/1995 | Chang | 297/354.12 X |
| 5,454,624 | 10/1995 | Anglade et al. | 297/354.13 |
| 5,466,044 | 11/1995 | Barley et al. | 297/250.1 X |
| 5,487,588 | 1/1996 | Burleigh et al. | 297/250.1 X |
| 5,549,357 | 8/1996 | Counts et al. | 297/354.13 |
| 5,669,663 | 9/1997 | Feuerherdt | 297/253 |
| 5,690,386 | 11/1997 | Chabanne | 297/452.2 X |
| 5,697,494 | 12/1997 | Christy | 200/530 |
| 5,788,183 | 8/1998 | Marechal | 297/354.13 X |
| 5,918,934 | 7/1999 | Siegrist | 297/250.1 |

FOREIGN PATENT DOCUMENTS

| | | |
|---|---|---|
| 0 537 019 A2 | 4/1993 | European Pat. Off. . |
| 43 40 677 A1 | 6/1995 | Germany . |
| 42 16 925 C2 | 10/1995 | Germany . |
| 1186808 | 4/1970 | United Kingdom . |

Primary Examiner—Peter M. Cuomo
Assistant Examiner—Stephen Vu
Attorney, Agent, or Firm—Michael J. Striker

[57]    ABSTRACT

A device for releasable mounting of objects on a vehicle seat having a seat frame with a seat and a back, the device has a first holder which cooperates with a second holder provided in an object, the first holder being connected with a turning axle which is adapted to be supported at both sides of the seat frame under a gap formed between the back and the seat, so that when the gap between the back and the seat is increased in response to folding of the back, the first holder is turnable about the turning axle from its rest position to its use position, the first holder being arranged so that in the use position it extends inclinedly and forwardly upwardly through the gap formed between the back in an upright position and the seat, the first holder being couplable with the second holder of the object so that when coupled, it is reliably supported on the back and the seat, and an abutment fixed to the seat, so that in the use position the first holder abuts against the abutment, while in the rest position the first holder is turned in a space between the seat and a vehicle bottom.

6 Claims, 6 Drawing Sheets

DEVICE FOR RELEASABLE MOUNTING OF OBJECTS, IN PARTICULAR CHILDREN SEATS, ON A VEHICLE SEAT WITH FOLDABLE BACK

BACKGROUND OF THE INVENTION

The present invention relates to a device for releasable mounting of objects, in particular children seats, on a vehicle seat with a foldable back, in which a first, seat integrated holder cooperates with a second holder on an object to be mounted.

The European patent document EP 0 537 019 82 discloses a device for holding a child's seat on a vehicle seat. This device has two shackles which extend from a gap formed between the back and the seat surface, and a further shackle which is arranged centrally on the lower edge of the seat front side. The child's seat has two coupling parts provided on its seat front side, and a holder with a coupling part at the rear side of its back. For mounting, the child's seat is placed on the vehicle seat and inserted with its coupling part arranged on the front side into the shackles extending to the seat surface. After this, the seat cushion of the vehicle is pressed downwardly and the holder arranged on the rear side of the child's seat is suspended with its coupling part in the shackle on the front side of the vehicle seat. After relaxing of the seat cushion, this holding part is under tensioning. The important disadvantage of this mounting is that the holder of the child's seat can become inefficient very fast, namely when the child's seat tilts forwardly under the action of braking deceleration. Thereby the tensioning is removed and the front holder of the child's seat is released.

The German patent document D 42 16 925 C2 discloses a further device for releasable holding of objects on a vehicle seat. In this reference at the left and right side of the seat belt locks are arranged on conventional lashes and are mounted on the seat frame, so that they move during the seat adjustment together with it. A support part is placed on the seat surface and is provided in the region of the belt locks with downwardly extending shackles and in some cases with an abutment part for the back of the vehicle seat. The position of the belt locks and the shackles is selected so that the support part and in some cases its abutment part abut against the seat surface or the back when the shackles engage the belt lock. In an advantageous embodiment the belt locks are arranged in a transitional region between the back and the seat surface and the shackles are arranged correspondingly in a transition region between the support part and the abutment part. The latter extends from there inclinedly rearwardly and downwardly. Because of this arrangement the support part and the abutment part are pulled in the upholstery of the seat surface or the back during establishing the coupling between the shackles and the belt locks, so that they abut very firmly. The support part can be an integral component of an object to be held, for example a child's seat. Since the belt locks are arranged in the left and the right side near the seat, the child's seat must be substantially wider than required, which for example is disadvantageous for the system where the child's seat is used not in an automobile, but instead as a seat shell for a child's carriage. The child carriage chassis must be designed to be wide in this case. The disadvantage of this construction is that the belt locks mounted on the flexible lashes can not provide a directionally rigid connection with the seat frame and extend during non use into the space in a disturbing manner.

The German patent document DE 43 40 677 A1 discloses a construction in which the seat cushion of a vehicle seat is at least partially releasable from the seat frame located under the cushion. The releasable portion of the seat frame has a first holder which cooperates with the second holder connected with the object to be mounted. This solution has the advantage that a rigid connection between the rigid frame and the object to be mounted is provided. This is especially advantageous when the object to be mounted is a child's seat. Because of the rigid connection to the bending-resistant seed frame, a child who sits in the child's seat participates in the case of an accident directly in the dampened negative acceleration of the passenger salon, resulting from the deformation of the chassis. Thereby an injury risk is reduced. However this construction has the disadvantage that the removed seat cushion or the removed part of the seat cushion must be reliably stowed and limits the usable loading space, for example in a trunk.

SUMMARY OF THE INVENTION

Accordingly, it is an object of the present invention to provide a device for releasable mounting of objects in particular a child's seats on a vehicle seat, which avoids the disadvantages of the prior art.

More particularly, it is an object of present invention to provide a device of the above mentioned type which is rigidly connected with the supporting structure of the vehicle seat, is easy to operate, and does not interfere in its rest position.

In keeping with these objects and with others which will become apparent hereinafter, one feature of present invention resides, briefly stated, in a device for releasable mounting of objects, which include a first holder rigidly connected with a turning axle which is supported at both sides of a seat frame under a gap formed between the back and the seat, the first holder with the folded back is turnable through the increasing gap between the back and the seat around the turning axle from its rest position to its position of use, in the use position the first holder extends through a gap formed between the erected back and the seat forwardly upwardly, so that during coupling of the first holder with the second holder, the object to be mounted reliably abuts against the back and the seat, in the use position the first holder abuts against a seat-fixed abutment, in the rest position the first holder is turned in the space between the seat and the vehicle bottom.

In the device according to the invention the foldable back is used to make available the carrying frame structure of the vehicle seat having a high rigidity, which is otherwise not acceptable because of the upholstery, in an accessible form above the upholstery at the front side of the seat. This is attained in that, when the back is folded, the holder pivots through a then increased gap between the folded back and the seat surface coming to rest against a seat-fixed abutment. The holder is rigidly afixed to the frame structure of the vehicle seat.

It is believed to be understood that the components of the holder are dimensioned so that in the event of a crash the generated return forces are reliably transferred to the frame structure of the vehicle seat. When the holder is no longer needed, it can be turned with the folded back by a handle to its rest position under the seat, where it does not cause optical or physical interference.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
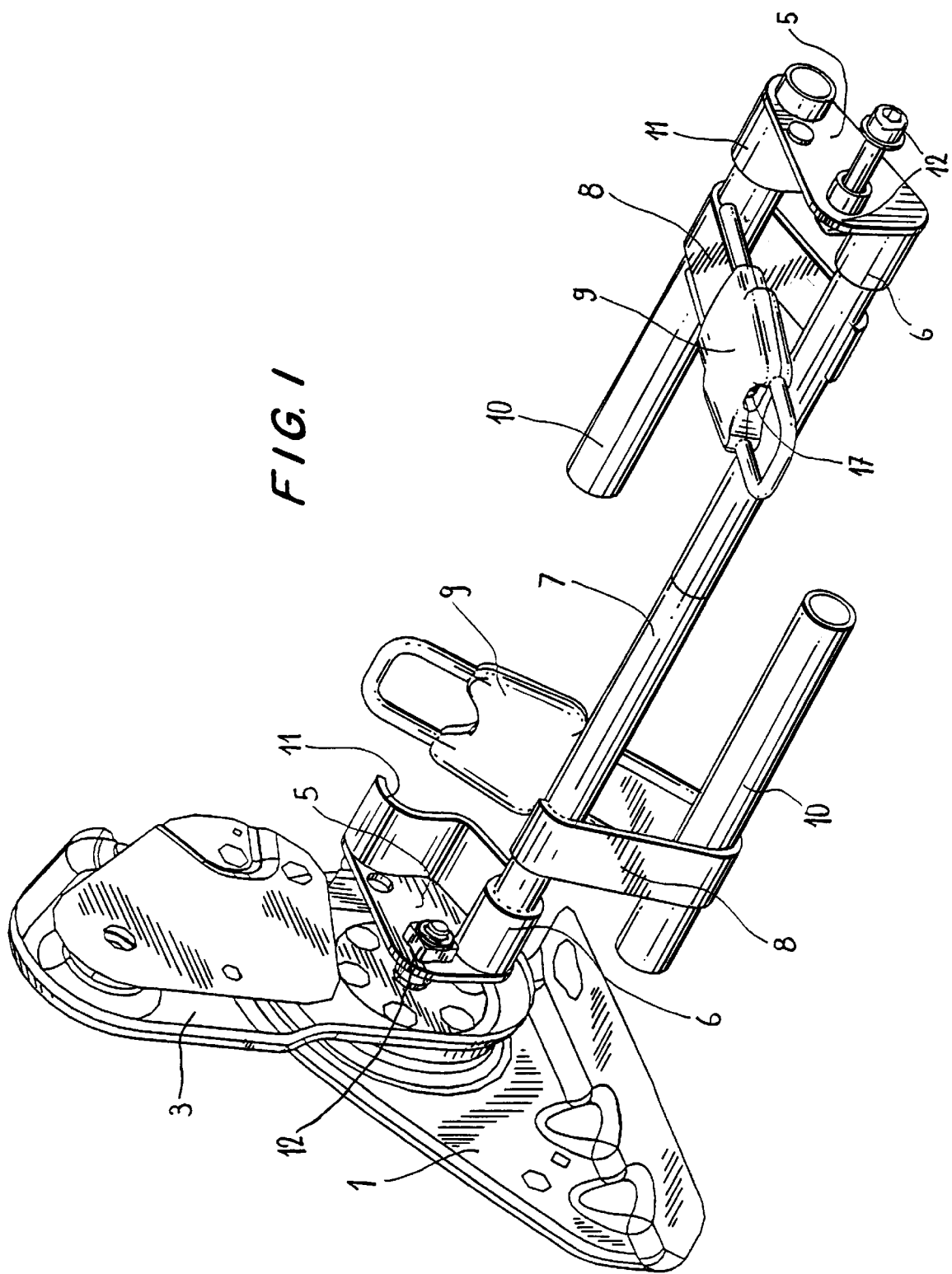
FIG. 1 is a perspective view of a device in accordance with present invention, wherein the left side shows its rest position and the right side shows its use position with a cut in the middle.

FIG. 1 at the left side shows an adaptor 1 for mounting a back 2 more clearly illustrated in FIGS. 2–5 in a not shown seat frame. A back console 3 is rigidly connected with the adaptor 1, and a tilting axle 4 for the back 2 is arranged in the console. These components are provided also symmetrically at the right side of FIG. 1, but not shown for the sake of clarity of illustration.

A bearing console 5 is formed-lockingly connected with the adaptor 1 and the back console 3 at both sides on the inner side. A screw connection 12 is used for connection of the bearing consoles. The bearing console 5 are mounted fixedly with the seat and forms a rigid assembly with the adaptor 1 and the back console 3. Each of the bearing consoles 5 has a bearing bushing 6, and a turning axle 7 is rotatably supported in the bearing bushing. Two V-shaped bent holding parts 8 are welded on the turning axle 7 at a distance from one another on one of its ends. Coupling parts 9 are arranged on the other end of the holding part 8 and rigidly connected with it. A reinforcing pipe 10 is welded in the wedge region of each holding part 8 and connects it. The reinforcing pipe 10 extends parallel to the turning axle 7. It extends outwardly beyond the holding part 8, so that it comes to abutment against a rigid abutment 11 integrated in the bearing consoles 5. This position is shown at the right side of FIG. 1. In position, the reinforcing pipe 10, for example is engaged in a not shown snap lock arranged on the seat frame or on the vehicle bottom, so that the disturbing swinging movements of the mounting device are avoided.

As can be seen from FIG. 1, the structure which includes the bearing consoles 5, the turning arm 7, the holding parts 8 and the reinforcing pipe 10 is very robust or bending resistant. Forces which act on this structure are reliably transferred through the screws 12 to the seat frame and from there to the bottom part of the vehicle chassis.

The use of the inventive device is illustrated in FIGS. 2–5. In these figures the back 2 and the seat 13 as well as their upholstery 14 and 15 are shown schematically. The vehicle bottom is identified by a line 16.

Figure 2:
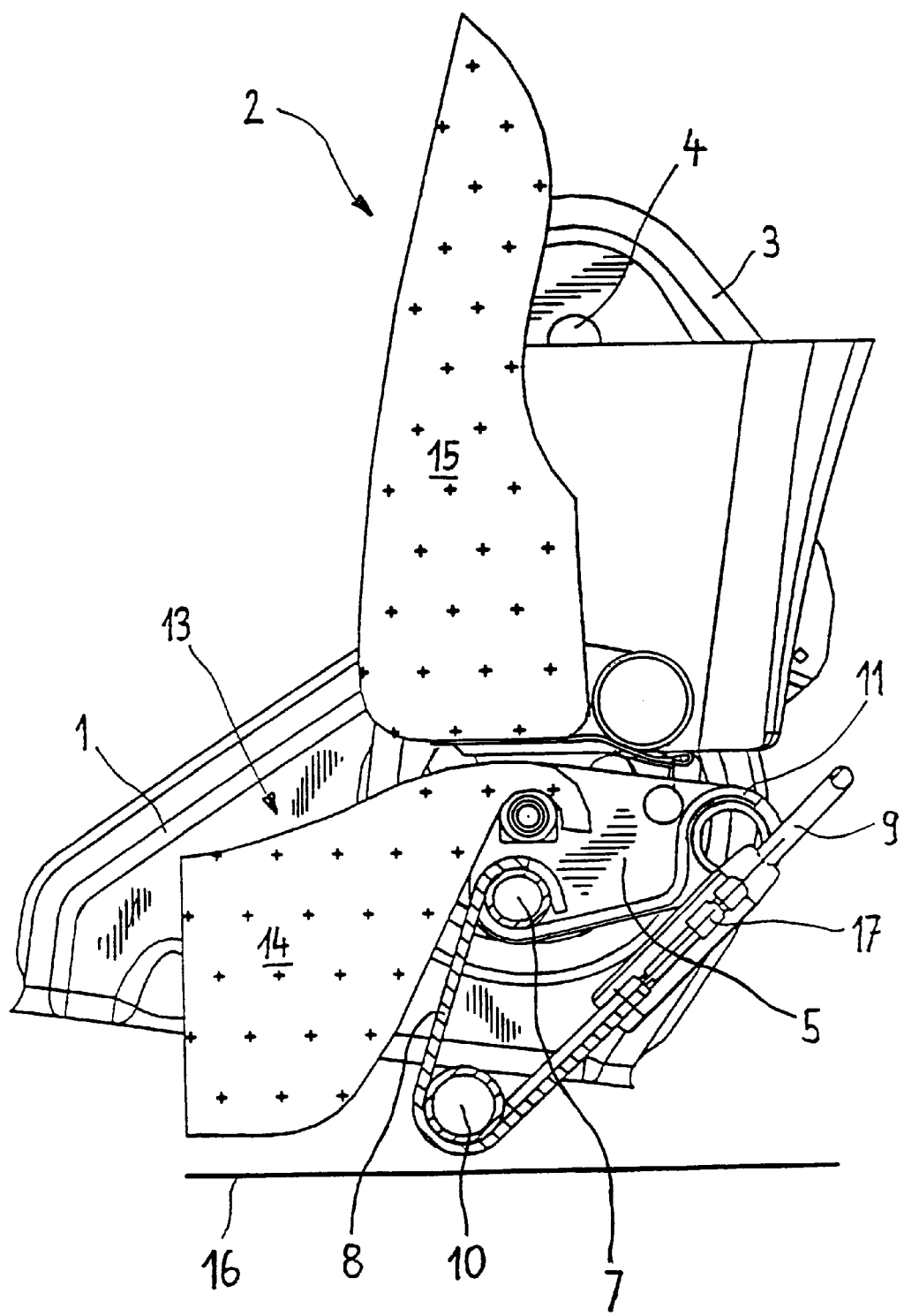
FIG. 2 is a side view of the device in the rest position with a partial showing of a back, a seat, and a frame structure.
Figure 3:
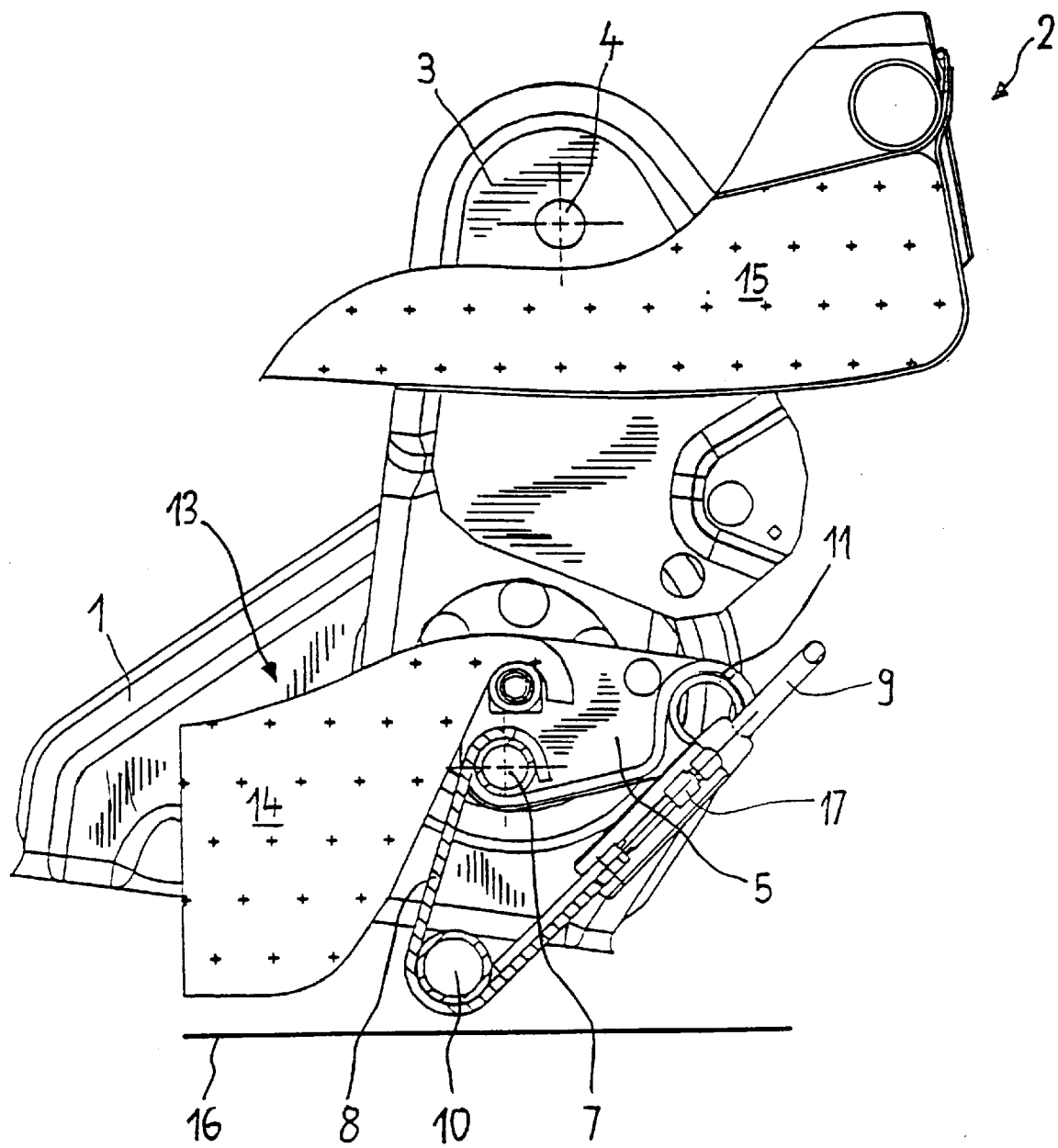
FIG. 3 is a view corresponding to the view of FIG. 2 but showing the back in folded position.
Figure 4:
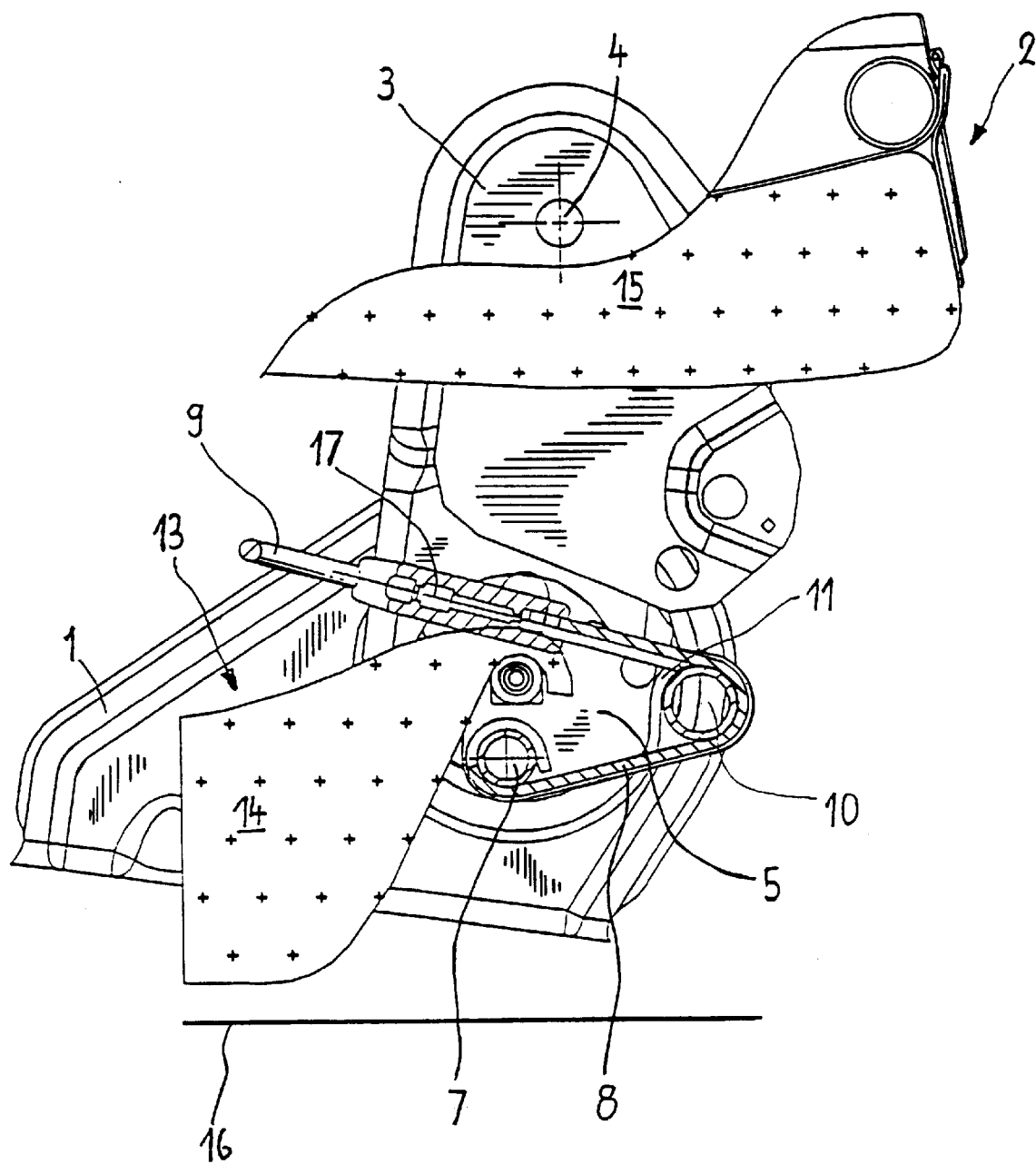
FIG. 4 is a view substantially corresponding to the view of FIG. 3 but showing the device in a turned position of views.

FIG. 2 shows the inventive device in its rest position. It can be seen that the device in this position is turned into the space between the seat 13/back 2 and the vehicle bottom 16 and does not cause any optical or physical disturbance. In order to bring the device to the position for use, the back 2 is folded about the axle 4. This situation is shown in FIG. 3. The device can be turned now through the wide gap between the back 2 and the seat 13 around the turning axle 7 forwardly to the position of use shown in FIG. 4. The dimensions and the turning radii of the holding parts 8 are selected so that this can be performed without problems. In the position of use the reinforcing pipe 10 is supported at its both ends on the supports 11. After folding back of the back 2 to its vertical position shown in FIG. 5, the device is ready for use.

Figure 5:
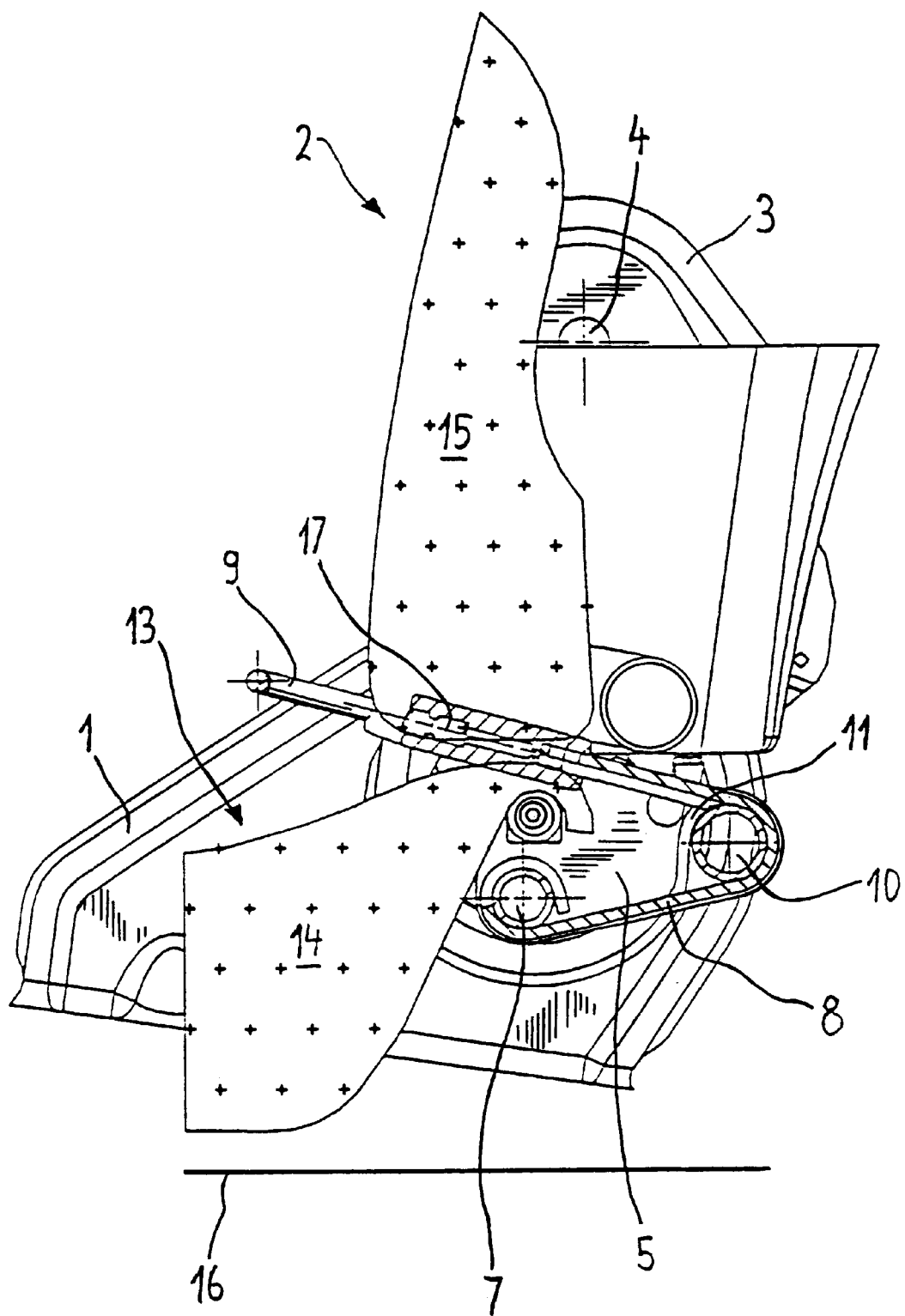
FIGS. 5 and 6 are a view substantially corresponding to the view of FIG. 4 but showing the device with the lifted back.
Figure 6:
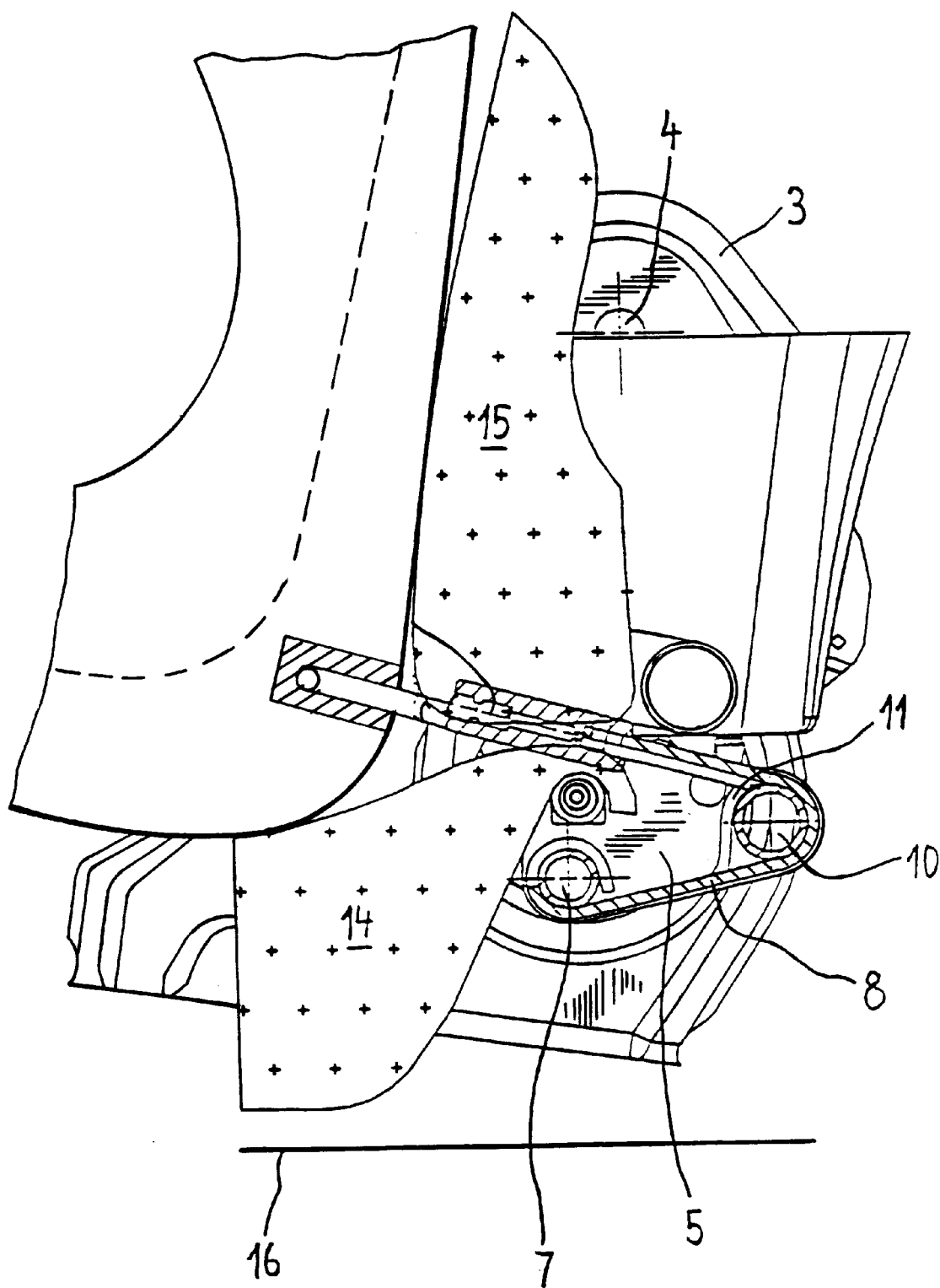

In the use position shown in FIG. 5, the coupling parts 9 extend through the gap between the back 2 and the seat 13 inclinedly and forwardly upwardly. An object to be mounted can be now fitted with its corresponding coupling parts onto the coupling part 9 until their engagement. The object is now fixedly connected with the frame structure of the motor vehicle.

The spacial position of the coupling part 9 relative to the upper side of the seat and the front side of the back is selected in cooperation with the object to be mounted so that the object during fitting onto the coupling part 9 is pulled in the upholstery 14 and 15 of the seat and the back 2 and thereby is fixedly supported on the same.

The inventive arrangement is advantageous for mounting of child's seats. The child's seats are usually substantially smaller than the vehicle seat. With a corresponding selection of the distance between the holding parts 8, the corresponding and optimal holding of the child's seat is provided.

The coupling parts 9 have integrated contact switches 17 which during engagement of the coupling parts 9 to the corresponding coupling parts of the holder of the object to be mounted, are activated and signal an orderly mounting. This signal can be used simultaneously for example for turning off the operation of the air bag for the seat space occupied by the object. This is especially desirable when the object is a child's seat, for preventing an injury by the air bag of a child sitting in the child's seat in the case of a crash.

It will be understood that each of the elements described above, or two or more together, may also find a useful application in other types of constructions differing from the types described above.

While the invention has been illustrated and described as embodied in device for releasable mounting of objects, in particular children seats, on a vehicle seat with foldable back, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A vehicle seat arrangement, comprising a vehicle seat having a seat frame with a seat and a back; a children seat releasably mountable on said vehicle seat; and a device for releasably mounting said children seat on said vehicle seat, said device including a first holder provided in the vehicle seat and a second holder provided in said children seat and releasably arrestable with said first holder, said first holder being connected with a turning axle which is supported at both sides of the seat frame under a gap formed between the back and the seat, so that when the gap between the back and the seat is increased in response to folding of the back, said first holder is turned about said turning axle from its rest position to its use position, said first holder being arranged so that in said use position it extends inclinedly forwardly upwardly through the gap formed between the back in an upright position and the seat, said first holder being couplable with the second holder of the children seat so that when coupled, it is reliably supported on the back and the seat; and an abutment fixed to the seat, so that in the use position said first holder abuts against said abutment, while in the rest position said first holder is turned into a space between the seat and a vehicle bottom.

2. The vehicle seat arrangement, comprising as defined in claim 1, wherein said first holder is composed of two substantially V-shaped parts having one end connected with said turning axle and another end provided with coupling parts which are releasably arrestable in said corresponding coupling parts of the second holder, said coupling parts of said first holder corresponding to said coupling parts of said second holder.

3. The vehicle seat arrangement, as defined in claim 2; and further comprising a reinforcing member extending parallel to said turning axle, said holding part being fixedly connected with said reinforcing member in the use position abutting against said abutment.

4. The vehicle seat arrangement, as defined in claim 3, wherein said abutment includes abutment members arranged at both sides of the seat frame, said reinforcing member abutting against said abutment members in the use position.

5. The vehicle seat arrangement, as defined in claim 2, wherein said coupling parts are provided with sensing means which form a signal indicating an orderly mounting of the object to be mounted.

6. The vehicle seat arrangement as defined in claim 5, wherein said sensing means include contact switches.

* * * * *